INVENTOR.
LAWRENCE D. FRANTZ

Dec. 21, 1965    L. D. FRANTZ    3,224,132
FISHING EQUIPMENT RETRIEVER

Filed June 25, 1964    2 Sheets-Sheet 2

INVENTOR.
LAWRENCE D. FRANTZ
BY John M Nolan
ATTORNEY

United States Patent Office 3,224,132
Patented Dec. 21, 1965

3,224,132
FISHING EQUIPMENT RETRIEVER
Lawrence D. Frantz, 2515 E. Central Park Ave.,
Davenport, Iowa
Filed June 25, 1964, Ser. No. 378,007
4 Claims. (Cl. 43—17.2)

This invention relates to an improved fishing equipment retriever, and more particularly to a device for retrieving snagged fish hooks, artificial lures and their appurtenances.

Most devices of this nature basically consist of a weight having a cylindrical bore, the snagged line being inserted into the bore, the weight sliding down the snagged line and striking the snagged hook or lure, jarring it loose from the snag. Various means are utilized to introduce and keep the line within the cylindrical bore. However, most of these means are relatively complicated or difficult and relatively expensive to manufacture, or difficult to operate, especially under adverse conditions which are frequently encountered while fishing. The present invention overcomes these objections, comprising only two parts which are simple and inexpensive to manufacture and assemble, the invention also being of rugged construction and easy to manipulate under any conditions.

Accordingly, an object of the present invention is to provide a device for retrieving snagged fish hooks, lures and other fishing equipment.

Another object of the present invention is to provide a fishing equipment retriever that is simple and inexpensive to manufacture and assemble.

Still another object of the present invention is to provide a fishing equipment retriever that is of rugged construction and easy to operate and manipulate even under adverse conditions.

Other objects and advantages of the invention will appear more fully hereinafter from a consideration of the detailed description which follows, taken together with the accompanying drawings wherein an embodiment of the invention is illustrated. It is to be expressly understood, however, that the drawings are for the purpose of illustrating and description and are not to be construed as defining the limits of the invention.

Figure 1:
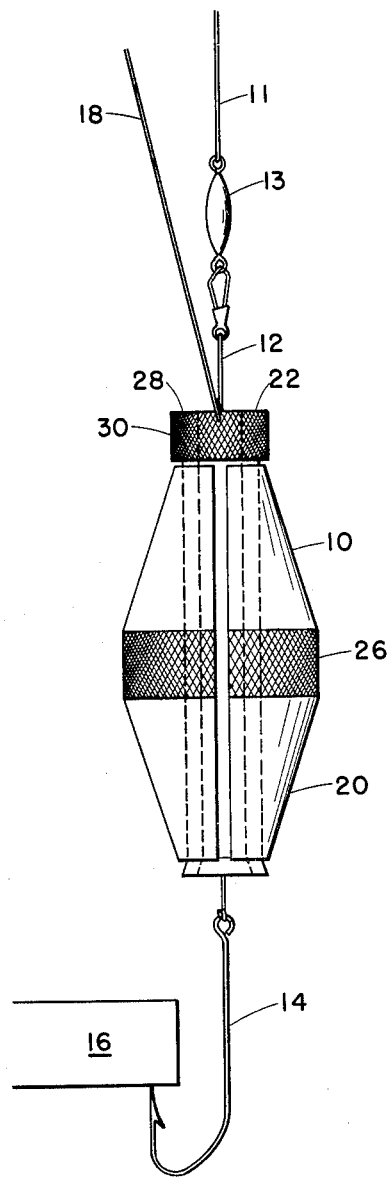
FIG. 1 is a front elevation view showing the device in use.

Referring now to the drawings and in particular to FIG. 1, there is shown fishing equipment retriever 10 encompassing fish line 11 which is attached to hook 14 having its point caught in snag 16. Fish line 11 is partly comprised of leader 12 and sinker 13. Retriever 10 is fastened to retriever line 18. Retriever 10 is comprised of outer cylinder 20 and concentric inner cylinder 22 which is rotatably mounted in axial bore 24 in outer cylinder 20. Outer cylinder 20 is tapered at each end and has a knurl 26 around its outer circumference on the untapered surface. Outer cylinder 20 is made of relatively dense material to provide a substantial weight, such as a heavy metal or advantageously an impregnated plastic with a high specific gravity. Due to the substantial weight and streamlined configuration, retriever 10 moves through the water at a substantial speed providing a relatively large impact when it strikes snagged hook 14. Inner cylinder 22 has a shoulder 28 around its perimeter at its upper end, the outer surface of said shoulder having a knurl 30.

Figure 2:
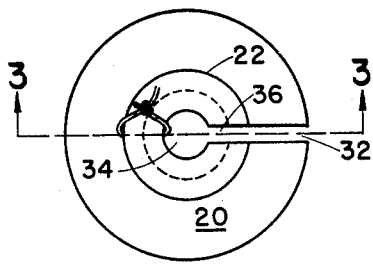
FIG. 2 is a top view of the device in "load" position.
Figure 3:
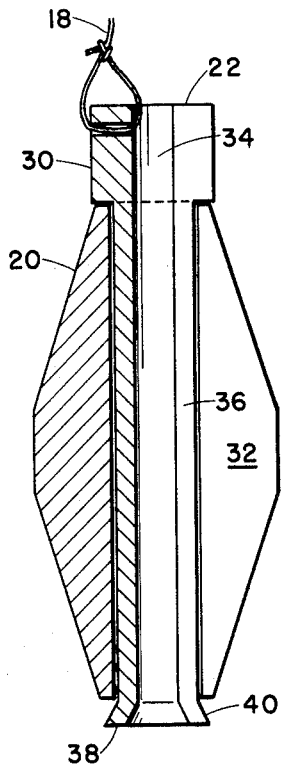
FIG. 3 is a longitudinal section of the device in "load" position taken along line 3—3 of FIG. 2.

Referring now to FIGS. 2, 3, 4 and 5, the construction of the retriever 10 can be seen more clearly. Outer cylinder 20 has a longitudinal slot 32 communicating with axial bore 24 throughout its length, said axial bore having approximately the same diameter as inner cylinder 22 which is rotatably mounted in said bore. Inner cylinder 22 also has an axial bore 34 throughout its length and a longitudinal slot 36 communicating with said bore. In "load" position as shown in FIGS. 2 and 3, slots 32 and 36 are aligned. Shoulder 30 of inner cylinder 22 is larger in diameter than bore 24 and rests on outer cylinder 20. The lower end 38 of inner cylinder 22 projects a short distance outside of bore 24. The retriever 10 is assembled by inserting lower end 38 of cylinder 22 through bore 24 and flaring said lower end 38 of inner cylinder 22 around its perimeter, by means of a flaring tool inserted into bore 34, inner cylinder 22 being made of relatively malleable material. Taper 40 on said lower end 38 begins a short distance after inner cylinder 22 projects from bore 24, allowing a small amount of axial motion of the cylinders relative to each other.

Figure 4:
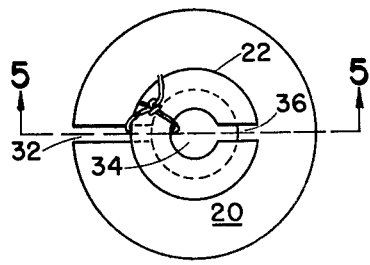
FIG. 4 is a top view of the device in "lock" position.
Figure 5:
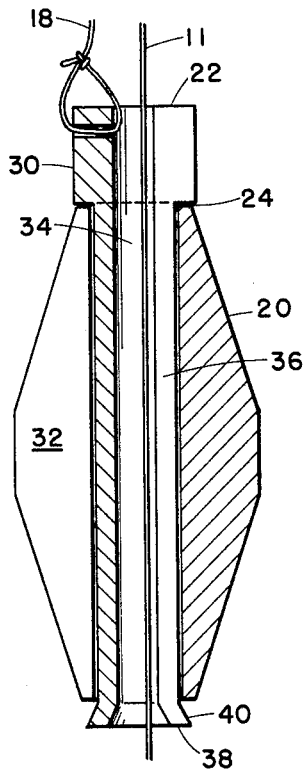
FIG. 5 is a longitudinal section of the device in "lock" position, taken along line 5—5 of FIG. 4.

Fish line 11 is inserted through slots 32 and 36 into bore 34. Outer cylinder 20 is then rotated relative to inner cylinder 22 to "lock" position as shown in FIGS. 4 and 5. The cylinders are locked in this position by forcing outer cylinder 20 onto taper 40.

To use the device snagged fish line 11 is inserted into bore 34 while the device is in the "load" position. The two cylinders are then rotated relative to each other until their respective longitudinal slots are no longer aligned. The drawings show a 180° rotation, although this much rotation is not necessary. Knurled surfaces on each cylinder facilitate the rotation. Locking the cylinders in this position by forcing outer cylinder 20 onto taper 40 can easily be accomplished by lightly striking lower end 38 in an axial direction against a solid object, the momentum of outer cylinder forcing it onto the taper. Conversely, the lock can be released by axially striking shoulder 30 against a solid object. To retrieve the snagged hook 14, retriever 10 is rapidly lowered around fish line 11 by means of retriever line 18. Leader 12 and sinker 13 pass through bore 34, lower end 38 striking snagged hook 14 with considerable force in the opposite direction that hook 14 is inserted in snag 16. The impact will lock the cylinders more securely, avoiding the possibility of retriever 10 becoming disengaged from fish line 11. Occasionally, the first impact will not free the hook although successive impacts will free almost any snag.

While the fishing equipment retriever is of the construction shown and described, it is understood that the instant invention is not limited to any particular form of construction. Changes and modifications of the novel fishing equipment retriever may be made by those skilled in the art without departing from the scope of the instant invention. In the preceding detailed description certain vertical and horizontal positions of the retriever were used to illustrate it. The use of these positions should not be construed as limiting the scope of the invention.

I claim:

1. A fishing equipment retriever comprising a weighted outer cylinder of relatively dense material having an axial cylindrical bore throughout its length and a straight longitudinal slot communicating with said bore throughout the length of said bore, an inner cylinder having substantially the same diameter as and rotatably inserted in said bore, said inner cylinder also having an axial cylindrical bore throughout its length and a longitudinal slot communicating with said last mentioned bore throughout its length, said inner cylinder having a shoulder at one end larger that the diameter of the bore in said outer cylinder, the other end of said inner cylinder being of malleable material and projecting a relatively short distance beyond said outer cylinder and flaring to a larger diameter than the diameter of the bore in said outer cylinder, said flare constituting a locking means between said outer cylinder and said inner cylinder, the flare commencing a short distance after the inner cylinder exits from the bore in said outer cylinder allowing a small amount of relative axial locking motion between the cylinders.

2. A fishing equipment retriever comprising a weighted outer cylinder of relatively dense material having an axial cylindrical bore throughout its length and a straight longitudinal slot communicating with said bore throughout the length of said bore capable of receiving a fishing line, an inner cylinder having substantially the same diameter as and rotatably inserted in said bore, said inner cylinder having an axial cylindrical bore throughout its length larger in diameter than the average fish line sinker and a straight longitudinal slot communicating with said last mentioned bore throughout the length of said bore also capable of receiving a fish line, said inner cylinder having a shoulder at one end larger than the diameter of the bore in said outer cylinder, the other end of said inner cylinder being of malleable material and projecting a relatively short distance beyond said outer cylinder, and flaring to a larger diameter than the diameter of the bore in said outer cylinder, said flare constituting a locking means between said outer cylinder and said inner cylinder, the flare commencing a short distance after the inner cylinder exits from the bore in said outer cylinder, allowing a small amount of relative axial locking motion between the cylinders.

3. A fishing equipment retriever comprising a weighted outer cylinder of relatively dense material having an axial cylindrical bore throughout its length and a straight longitudinal slot communicating with said bore throughout the length of said bore capable of receiving a fishing line, said cylinder tapering to a smaller diameter at one end and having a knurl on its outer surface, an inner cylinder having substantially the same diameter as and rotatably inserted in said bore, said inner cylinder having an axial cylindrical bore throughout its length larger in diameter than the average fish line sinker and a straight longitudinal slot communicating with said last mentioned bore throughout the length of said bore, also capable of receiving a fishing line, said inner cylinder having a shoulder at one end larger in diameter than the diameter of the bore in said outer cylinder, said shoulder having a knurled outer surface, the other end of said inner cylinder being of malleable material and projecting a relatively short distance beyond said outer cylinder and flaring to a larger diameter than the diameter of the bore in said outer cylinder, said flare constituting a locking means between said outer cylinder and said inner cylinder, the flare commencing a short distance after the inner cylinder exits from the bore in said outer cylinder, allowing a small amount of relative axial locking motion between the cylinders and a retrieving line having one end attached to said retriever.

4. A fishing equipment retriever comprising a weighted outer cylinder made of plastic impregnated to increase its specific gravity, having an axial cylindrical bore throughout its length and a straight longitudinal slot communicating with said bore throughout the length of said bore capable of receiving a fishing line, said cylinder tapering to a smaller diameter at each end, an inner cylinder having substantially the same diameter as and rotatably inserted in said bore, said inner cylinder having an axial cylindrical bore throughout its length larger in diameter than the average fish line sinker and a straight longitudinal slot communicating with said last mentioned bore also capable of receiving a fishing line, said inner cylinder having a shoulder at one end larger in diameter than the diameter of the bore in said outer cylinder, said shoulder having a knurled outer surface, the other end of said inner cylinder being of malleable material and projecting a relatively short distance beyond said outer cylinder, and flaring to a larger diameter than the diameter of the bore in said outer cylinder, said flare constituting a locking means between said outer cylinder and said inner cylinder, the flare commencing a short distance after the inner cylinder exits from the bore in said outer cylinder, allowing a small amount of relative axial locking motion between the cylinders and a retrieving line having one end attached to said inner cylinder.

References Cited by the Examiner

UNITED STATES PATENTS

| 824,198 | 6/1906 | Norton. | |
| 2,385,415 | 9/1945 | Jackson | 43—17.2 |
| 2,534,790 | 12/1950 | Moore | 43—17.2 |
| 2,605,576 | 8/1952 | Young | 43—43.1 |
| 2,651,132 | 9/1953 | Lennen | 43—17.2 |
| 2,761,235 | 9/1956 | Payne | 43—17.2 |
| 2,845,660 | 8/1958 | Peiler. | |
| 2,872,752 | 2/1959 | Salzmann | 43—44.9 |
| 3,192,662 | 7/1965 | Hoyle | 43—44.91 |

FOREIGN PATENTS 17,494   1891   Great Britain.

SAMUEL KOREN, *Primary Examiner.*